US012569994B2

(12) United States Patent (10) Patent No.: US 12,569,994 B2
Oonishi et al. (45) Date of Patent: Mar. 10, 2026

(54) ROBOT APPARATUS

(71) Applicant: FANUC CORPORATION, Yamanashi (JP)

(72) Inventors: Moriaki Oonishi, Yamanashi (JP); Kuniyasu Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 103 days.

(21) Appl. No.: 18/039,584

(22) PCT Filed: Dec. 15, 2021

(86) PCT No.: PCT/JP2021/046230

§ 371 (c)(1),
(2) Date: May 31, 2023

(87) PCT Pub. No.: WO2022/138368

PCT Pub. Date: Jun. 30, 2022

(65) Prior Publication Data

US 2024/0091937 A1 Mar. 21, 2024

(30) Foreign Application Priority Data

Dec. 22, 2020 (JP) ................................. 2020-212453

(51) Int. Cl.
B25J 9/16 (2006.01)
B25J 9/12 (2006.01)

(52) U.S. Cl.
CPC ............. B25J 9/1664 (2013.01); B25J 9/123 (2013.01)

(58) Field of Classification Search
None
See application file for complete search history.

(56) References Cited

U.S. PATENT DOCUMENTS 5,214,749 A * 5/1993 Brown ................... B25J 9/1643
700/260
2021/0138668 A1* 5/2021 Chen ................... B25J 19/0029

FOREIGN PATENT DOCUMENTS

| CN | 102514550 A | 6/2012 | |
| CN | 108724247 A * | 11/2018 | ............ B25J 9/0081 |
| JP | S61-197089 U | 12/1986 | |
| JP | H2-269591 A | 11/1990 | |
| TW | M591907 U | 3/2020 | |

OTHER PUBLICATIONS

International Search Report issued in PCT/JP2021/046230 mailed on Mar. 1, 2022 with English Translation (5 pages).
Written Opinion of International Searching Authority issued in PCT/JP2021/046230 mailed on Mar. 1, 2022 with English Translation (5 pages).

* cited by examiner

Primary Examiner — Khoi H Tran
Assistant Examiner — Alyse Tramanh Tran
(74) Attorney, Agent, or Firm — HAUPTMAN HAM, LLP

(57) ABSTRACT

A robot apparatus includes: an arm part including a fixed element 54 and a plurality of linear motion elements assembled in multiple stages extendably with respect to the fixed element; a movement drive mechanism for driving movement of a foremost linear motion element among the plurality of linear motion elements; and a position identification unit for identifying a position of at least one linear motion element of the plurality of linear motion elements other than the foremost linear motion element with respect to the fixed element or the foremost linear motion element.

4 Claims, 8 Drawing Sheets

ROBOT APPARATUS

TECHNICAL FIELD

Embodiments described herein relate generally to a robot apparatus.

BACKGROUND ART

Collaborative robots are required to stop safely when the robot comes into contact with a person or an object. One method for detecting contact of a person or an object with a robot is, for example, to provide a torque sensor in a joint part of the robot and sensing the load applied to the torque sensor. This method makes it possible to detect that "the robot has come into contact with a person or an object" when the output value of the torque sensor exceeds a predetermined reference value. However, since a torque sensor detects a torque obtained by combining a torque caused by the contact of a person or an object with the robot and a torque caused by the motion of the robot, it is necessary to remove the torque caused by the motion of the robot from the detection result of the torque sensor in order to accurately detect the contact of a person or an object using the torque sensor.

The torque caused by the motion of the robot can be calculated from the amount of movement of the arm, the weight of the arm, and the like. However, in the case of a linear motion mechanism with an arm composed of a fixed element and a plurality of linear motion elements assembled in multiple stages with respect to the fixed element, the linear motion elements other than the linear motion elements to which the fixed element fixed to the arm support member and the drive mechanism of the arm are connected move freely with respect to adjacent elements. Therefore, there is a problem that the amount of movement of the arm fluctuates and the torque caused by the motion of the robot is not accurately known. For example, Patent Literature 1 discloses a configuration in which a telescopic boom of a high lift work vehicle is equipped with a telescopic length detector for detecting the telescopic length of the telescopic boom.

CITATION LIST

Patent Literature

Patent Literature 1: Japanese Unexamined Utility Model Application Publication No. 61-197089

DETAILED DESCRIPTION

Figure 1:
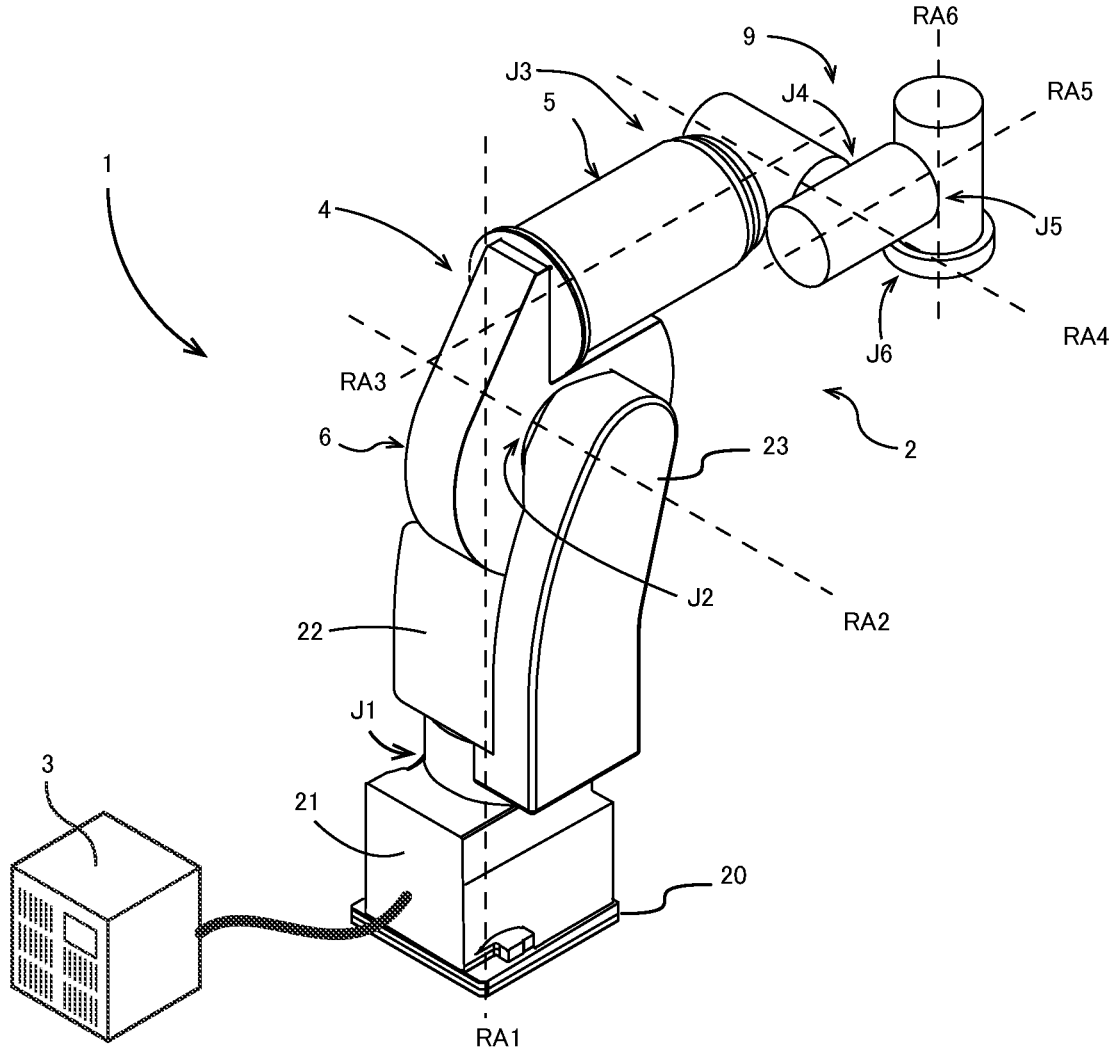
FIG. 1 is an external view of a robot apparatus according to the present embodiment.

A robot device according to one aspect of the present disclosure includes: an arm part including a fixed element and a plurality of linear motion elements assembled in multiple stages extendably with respect to the fixed element; a movement drive mechanism for driving movement of a foremost linear motion element among the plurality of linear motion elements; and a position identification unit for identifying a position of at least one linear motion element of the plurality of linear motion elements other than the foremost linear motion element with respect to the fixed element or the foremost linear motion element.

Hereinafter, a robot apparatus according to the present embodiment will be described with reference to the drawings. In the following description, constituent elements having substantially the same function and configuration are denoted by the same reference numeral, and repetitive descriptions will be given only where necessary.

As shown in FIG. 1, a robot apparatus 1 according to the present embodiment includes a polar coordinate type robot arm mechanism 2 and a control device 3 for controlling the robot arm mechanism 2.

The robot arm mechanism 2 has a flat base 20. A support frame is vertically erected on the base 20. The support frame is vertically divided into two parts: a lower support frame 21 and an upper support frame 22. The lower support frame 21 and the upper support frame 22 are connected to each other by a first rotary joint J1 having a rotation axis (first rotation axis RA1) perpendicular to the base 20 so as to freely rotate left and right. A linear motion mechanism 4 is supported by a side frame 23 fixed to an upper portion of the upper support frame 22 via a second rotary joint J2 having a rotation axis (second rotation axis RA2) orthogonal to the first rotation axis RA1 so as to freely rotate up and down. The linear motion mechanism 4 includes an extendable arm part 5. The arm part 5 is extendable along a linear motion axis RA3 orthogonal to the second rotation axis RA2, and constitutes a third linear motion joint J3. A wrist part 9 having three rotary joints J4, J5, J6 whose rotation axes are orthogonal to each other is connected to the distal end of the arm part 5. The rotary joint J4 has a rotation axis RA4 orthogonal to the linear motion axis RA3. The rotary joint J5 has a rotation axis RA5 perpendicular to the rotation axis RA4. The rotary joint J6 has a rotation axis RA6 perpendicular to the rotation axis RA4 and the rotation axis RA5. The wrist part 9 is provided with an adapter for attaching an end effector such as a gripper.

Figure 2:
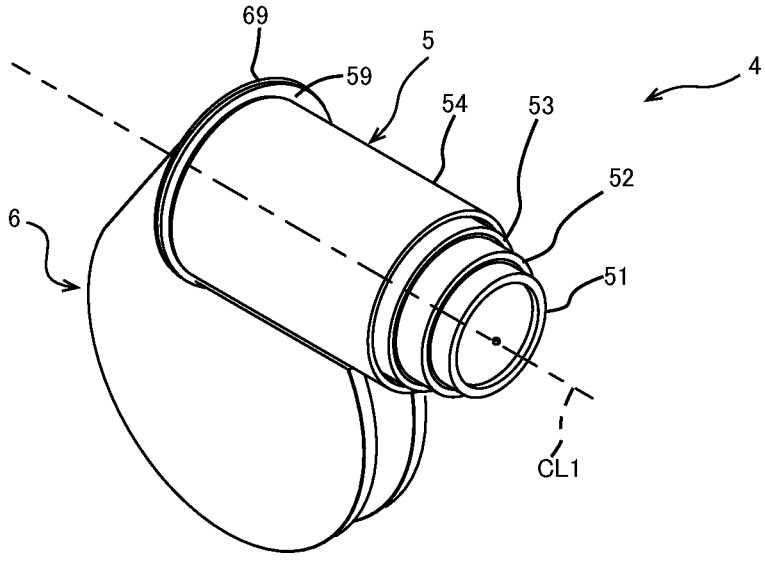
FIG. 2 is a perspective view showing a state where the arm part shown in FIG. 1 is contracted.
Figure 3:
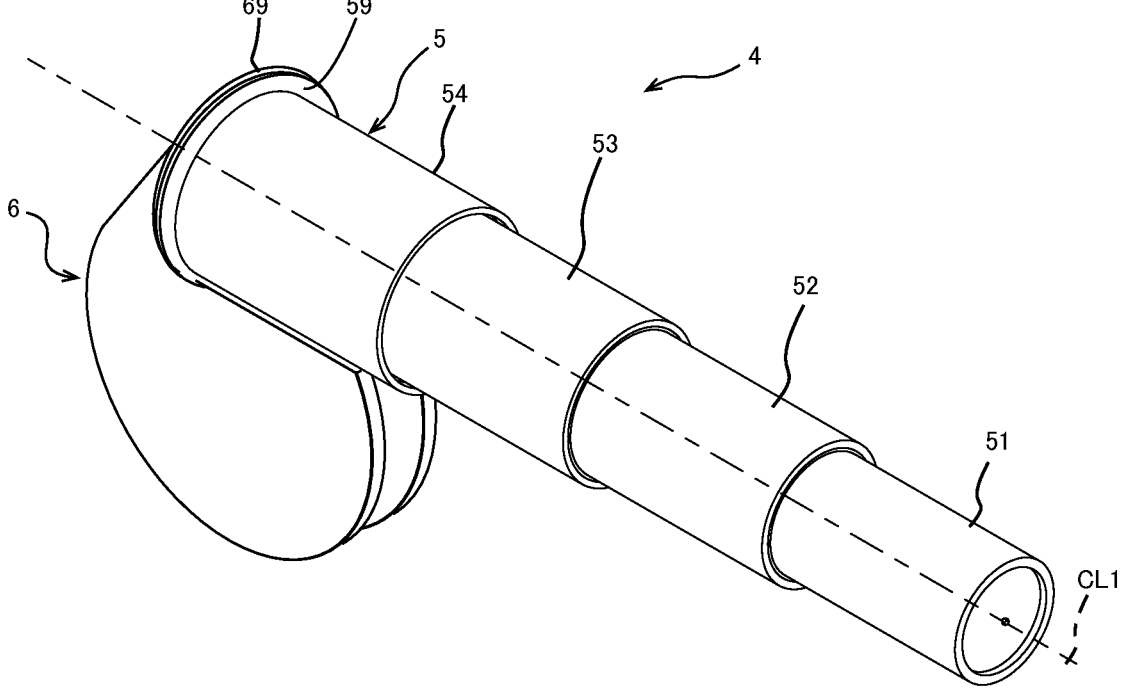
FIG. 3 is a perspective view showing a state where the arm part shown in FIG. 1 is extended.

The arm part 5 is composed of a fixed element and a plurality of linear motion elements assembled in multiple stages with respect to the fixed element. As shown in FIG. 2 and FIG. 3, in the present embodiment, the arm part 5 is composed of a plurality of, here four circular cylindrical bodies 51, 52, 53, 54 assembled in a telescopic structure (multi-stage nested structure). Two adjacent circular cylindrical bodies are slidably connected along a cylinder center line CL1 via a slider mechanism (not shown). The cylinder center line CL1 corresponds to the linear motion axis RA3 of the third linear motion joint J3. Of the four circular cylindrical bodies 51, 52, 53, 54, the rearmost circular cylindrical body 54 is fixed to a housing 6, and the foremost circular cylindrical body 51 is connected to an arm drive mechanism. The rearmost circular cylindrical body 54 fixed to the housing 6 corresponds to the fixed element, and the other circular cylindrical bodies 51, 52, 53 correspond to a plurality of linear motion elements, respectively. It should be noted that the circular cylindrical body may be any cylindrical body, and may be a quadrangular cylindrical body.

When the foremost circular cylindrical body 51 is moved forward by the arm drive mechanism, the circular cylindrical bodies are pulled out from the rear circular cylindrical bodies sequentially from the foremost circular cylindrical body 51, and as a result, the arm part 5 is extended forward along the cylinder center line CL1. When the foremost circular cylindrical body 51 is moved backward by the arm drive mechanism, the circular cylindrical bodies are accommodated in the rear circular cylindrical bodies sequentially from the foremost circular cylindrical body 51, and as a result, the arm part 5 is contracted backward along the cylinder center line CL1.

When the arm part 5 extends or contracts, since the foremost circular cylindrical body 51 is connected to the arm drive mechanism, the distance from the rearmost circular cylindrical body 54 to the foremost circular cylindrical body 51 can be calculated based on the control value of the arm extension/contraction length. However, among the four circular cylindrical bodies 51, 52, 53, 54, the circular cylindrical bodies 52, 53 other than the foremost circular cylindrical body 51 and the rearmost circular cylindrical body 54 are only slidably connected to the adjacent circular cylindrical bodies via the slider mechanism, so that the distance from the rearmost circular cylindrical body 54 to each of the other circular cylindrical bodies 52, 53 may vary every time the robot arm mechanism 2 moves, such as when the robot arm mechanism 2 raises or lowers the arm part 5 or when the robot arm mechanism 2 rotates the arm part 5. Therefore, the distance from the rearmost circular cylindrical body 54 to each of the other circular cylindrical bodies 52, 53, in other words, the position of each of the other circular cylindrical bodies 52, 53 with respect to the rearmost circular cylindrical body 54, may not be uniquely determined based on the control value of the arm extension/contraction length.

Figure 4:
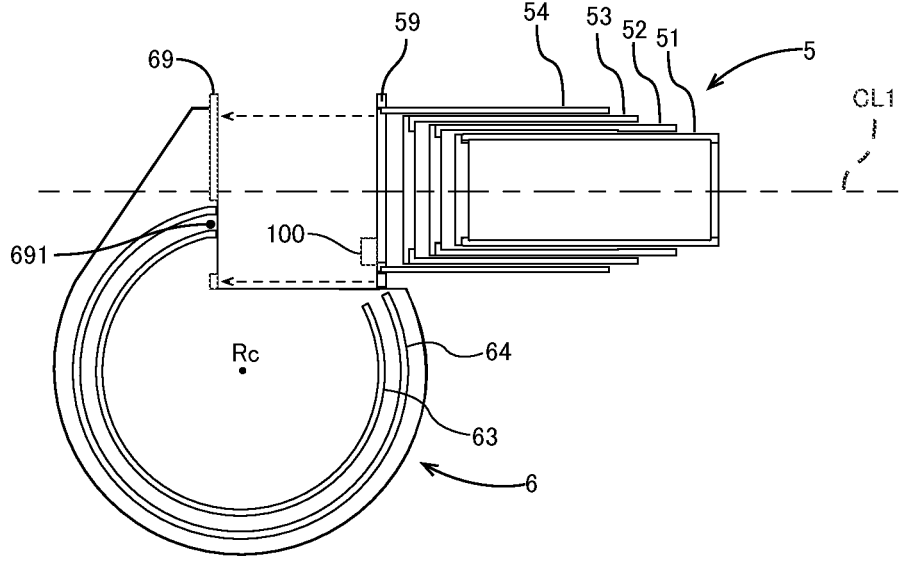
FIG. 4 is a side view showing an internal structure of a linear motion mechanism shown in FIG. 2 in a state where the arm part is removed.
Figure 5:
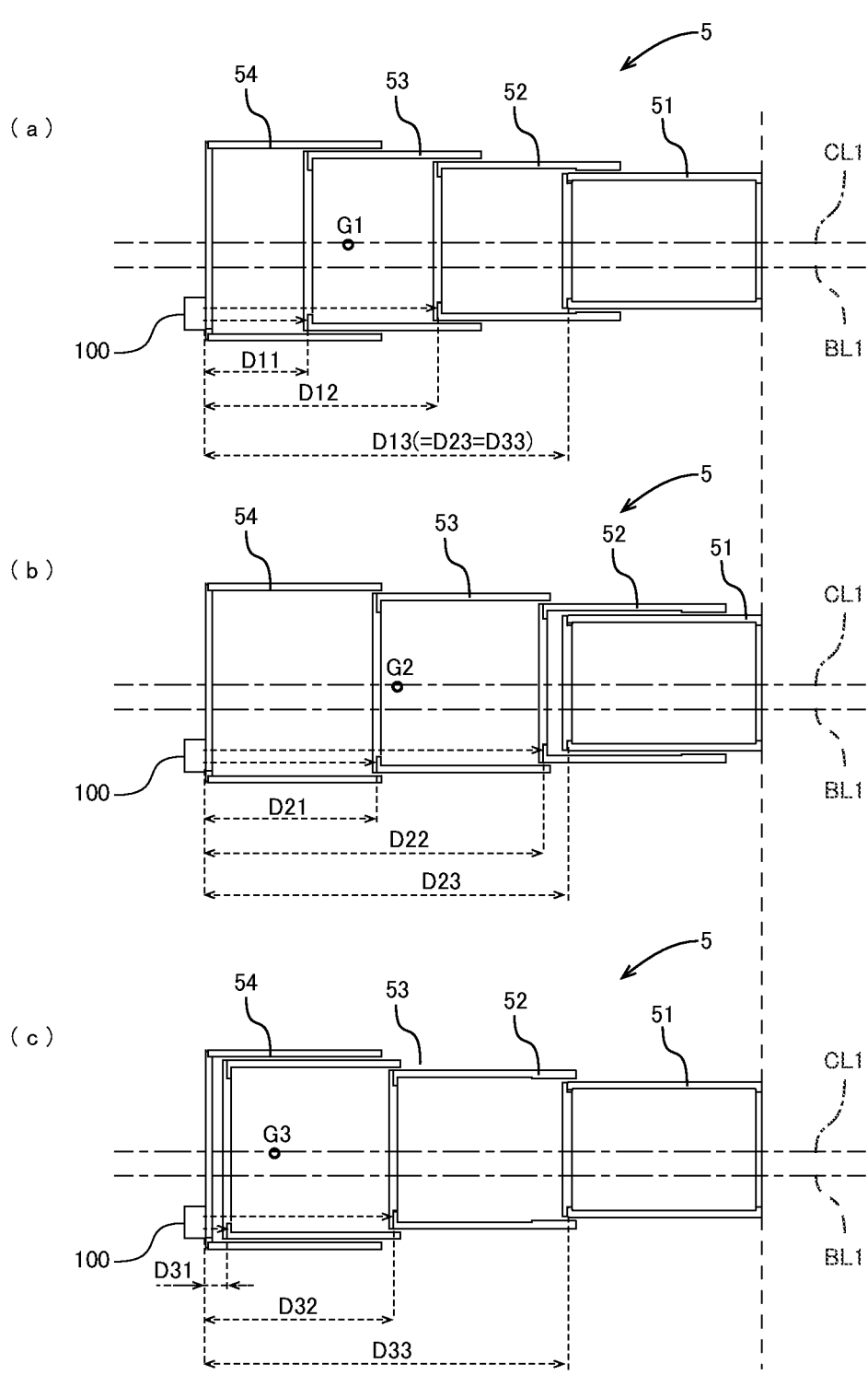
FIG. 5 is a side view showing the center of gravity position when the arm part shown in FIG. 4 is extended.

One feature of the robot apparatus 1 according to the present embodiment is that it includes a position identification unit for identifying the positions of the two circular cylindrical bodies 52 and 53 with respect to the rearmost circular cylindrical body 54. Typically, the robot apparatus 1 has a two-channel laser displacement gauge as a detection unit 100 for detecting the distance from the rearmost circular cylindrical body 54 to each of the two circular cylindrical bodies 52, 53. As shown in FIG. 4 and FIG. 5, the detection unit 100 is mounted inside the rearmost circular cylindrical body 54, below a movement axis BL1 of a block row 70, in such a manner that its two detection axes are oriented parallel to the cylinder center line CL1. Data on the distance from the rearmost circular cylindrical body 54 to the circular cylindrical body 53 and data on the distance from the rearmost circular cylindrical body 54 to the circular cylindrical body 52, which are measured by the laser displacement gauge, are input to the control device 3. In practice, the laser displacement gauge measures the distance from a reference position to the circular cylindrical body 53 and the distance from the reference position to the circular cylindrical body 52. The reference position is, for example, a position predetermined in the laser displacement gauge. On the other hand, the relative positional relationship between the laser displacement gauge and the rearmost circular cylindrical body 54 is fixed. Therefore, the amount of movement of the circular cylindrical body 53 with respect to the reference position corresponds to the distance from the rearmost circular cylindrical body 54 to the circular cylindrical body 53, and the amount of movement of the circular cylindrical body 52 with respect to the reference position corresponds to the distance from the rearmost circular cylindrical body 54 to the circular cylindrical body 52.

The control device 3 includes: a storage device, such as an HDD, storing therein a task program describing a series of operations by the robot arm mechanism 2 and a robot hand (not shown) attached to the robot arm mechanism 2, a position identification program for identifying the relative positional relationship between the plurality of circular cylindrical bodies 51, 52, 53, 54 constituting the arm part 5, a center of gravity position estimation program for estimating the center of gravity position of the arm part 5, a contact detection program for detecting contact of a person or an object with the robot arm mechanism 2, and the like; and an arithmetic processing device, such as a CPU, for executing the programs stored in the storage device. The arithmetic processing device functions as a position identification unit when executing the position identification program, functions as a center of gravity position estimation processing unit for estimating the center of gravity position of the arm part 5 when executing the center of gravity position estimation program, and functions as a contact detection unit for detecting contact of a person or an object with the robot arm mechanism 2 when executing the contact detection program.

The position identification unit identifies the positions of the other circular cylindrical bodies 52, 53 with respect to the rearmost circular cylindrical body 54 based on the distances from the detection unit 100 to the circular cylindrical bodies 52, 53 detected by the detection unit 100. The positional relationship between the rearmost circular cylindrical body 54 and the detection unit 100 is fixed, and the distance therebetween is known. Therefore, the positions of the other circular cylindrical bodies 52, 53 with respect to the rearmost circular cylindrical body 54 can be identified based on the distance from the rearmost circular cylindrical body 54 to the detection unit 100 and the distances from the detection unit 100 to the circular cylindrical bodies 52, 53.

The center of gravity position estimation processing unit estimates the center of gravity position of the arm part 5, based on the positions of the other circular cylindrical bodies 52, 53 with respect to the rearmost circular cylindrical body 54, the position of the foremost circular cylindrical body 51 with respect to the rearmost circular cylindrical body 54, which are obtained by executing the position identification program, and the weights of the four circular cylindrical bodies 51, 52, 53, 54. For example, as shown in FIG. 5(a), the center of gravity position estimation processing unit estimates a center of gravity position G1 based on a distance D11 from the rearmost circular cylindrical body 54 to the circular cylindrical body 53, a distance D12 from the rearmost circular cylindrical body 54 to the circular cylindrical body 52, and a distance D13 from the rearmost circular cylindrical body 54 to the circular cylindrical body 51, and the weights of the circular cylindrical bodies 51, 52, 53, 54. FIG. 5(b) shows a state where the circular cylindrical bodies 52, 53 have moved forward compared to the arm part 5 shown in FIG. 5(a). The center of gravity position estimation processing unit estimates a center of gravity position G2 located forward of the center of gravity position G1, based on a distance D21 from the rearmost circular cylindrical body 54 to the circular cylindrical body 53, a distance D22 from the rearmost circular cylindrical body 54 to the circular cylindrical body 52, a distance D23 from the rearmost circular cylindrical body 54 to the circular cylindrical body 51, and the weights of the circular cylindrical bodies 51, 52, 53, 54. FIG. 5(c) shows a state where the circular cylindrical bodies 52, 53 have moved backward compared to the arm part 5 shown in FIG. 5(a). The center of gravity position estimation processing unit estimates a center of gravity position G3 located rearward of the center of gravity position G1, based on a distance D31 from the rearmost circular cylindrical body 54 to the circular cylindrical body 53, a distance D32 from the rearmost circular cylindrical body 54 to the circular cylindrical body 52, a distance D33 from the rearmost circular cylindrical body 54 to the circular cylindrical body 51, and the weights of the circular cylindrical bodies 51, 52, 53, 54. The distance from the rearmost circular cylindrical body 54 to the circular cylindrical body 51 can be calculated from the arm extension/contraction length, and is the same in FIG. 5(a), FIG. 5(b), and FIG. 5(c).

The contact detection unit calculates a torque generated in each joint by the motion of the robot arm mechanism 2 using, for example, the Newton-Euler method or the Lagrange method, based on the center of gravity position of the arm part 5 estimated by the center of gravity position estimation unit, the center of gravity position of each link connecting joint parts of the robot arm mechanism 2, and the amount of movement (amount of rotation) of each joint part. The external force can be calculated based on the detection value of the torque sensor provided in each joint part and the calculation result of the torque generated in each joint part as the robot arm mechanism 2 moves. When the external force exceeds a predetermined value, the contact detection unit detects that a person or an object has come into contact with the robot arm mechanism 2.

Even while the robot arm mechanism 2 is not moving, for example, when the arm part 5 is stationary in a posture other than the horizontal posture, the circular cylindrical bodies 52, 53 may move with respect to the rearmost circular cylindrical body 54, and the center of gravity position of the arm part 5 may fluctuate. In order to maintain the accuracy of the contact detection by the contact detection unit even when the robot arm mechanism 2 is stationary, it is desirable that the arithmetic processing by the position identification unit, the center of gravity position estimation processing unit, and the contact detection unit be executed at predetermined intervals regardless of whether or not the robot arm mechanism 2 moves.

According to the robot apparatus 1, when the arm part 5 is composed of a fixed element (rearmost circular cylindrical body 54) and a plurality of linear motion elements (circular cylindrical bodies 51, 52, 53) assembled in multiple stages with respect to the fixed element, and the movement of the foremost linear motion element (foremost circular cylindrical body 51) is driven, the detection unit 100 can identify the positions of the other linear motion elements (circular cylindrical bodies 52, 53) with respect to the fixed element (rearmost circular cylindrical body 54). Thus, for example, the center of gravity position of the arm part 5 can be estimated, and the torque sensor provided in each joint part can separate the force caused by contact of a person or an object with the robot arm mechanism 2 from the force caused by the motion of the robot arm mechanism 2, and the accuracy of the contact detection can be improved.

In the present embodiment, the laser displacement gauge 100 is mounted inside the rearmost circular cylindrical body 54, below the movement axis of the block row 7, but the mounting position of the laser displacement gauge 100 is not limited to the one in the present embodiment. For example, the laser displacement gauge 100 may be mounted at a position above the movement axis BL1 of the block row 7. Alternatively, the laser displacement gauge 100 may be mounted at a position to the left or right of the movement axis BL1 of the block row 7. From the viewpoint of lowering the center of gravity of the arm part 5, it is advantageous to mount the laser displacement gauge 100 at a position below the movement axis BL1 of the block row 7. The detection unit 100 is not limited to the laser displacement gauge as long as the distance can be measured, and may be, for example, a laser reflection type distance sensor.

In the present embodiment, in order to identify the positions of the two circular cylindrical bodies 52, 53 with respect to the rearmost circular cylindrical body 54, a single two-channel laser displacement gauge is mounted inside the rearmost circular cylindrical body 54 as the detection unit 100 so that the distances from the detection unit 100 to the two circular cylindrical bodies 52, 53 are detected. The configuration of the detection unit 100 is not limited to this as long as the relative positional relationship between the plurality of circular cylindrical bodies 51, 52, 53, 54 can be identified. For example, the two-channel laser displacement gauge 100 may be provided in the housing 6 to which the rearmost circular cylindrical body 54 is fixed. Since the distance from the rearmost circular cylindrical body 54 to the foremost circular cylindrical body 51 can be calculated based on the arm extension/contraction length, the two-channel laser displacement gauge 100 may be mounted on the foremost circular cylindrical body 51 to measure the distances from the laser displacement gauge 100 to the other circular cylindrical bodies 52, 53 and identify the positions of the other circular cylindrical bodies 52, 53 with respect to the foremost circular cylindrical body 51. Of course, two one-channel laser displacement gauges may be used. In this case, one laser displacement gauge is mounted on the rearmost circular cylindrical body 54 to measure the distance from the rearmost circular cylindrical body 54 to the circular cylindrical body 53 in front thereof, the other laser displacement gauge is mounted on the circular cylindrical body 53 to measure the distance from the circular cylindrical body 53 to the circular cylindrical body 52 in front thereof, and from these results, the positions of the other circular cylindrical bodies 52, 53 with respect to the rearmost circular cylindrical body 54 can be identified. From the viewpoint of suppressing the weight load by mounting the laser displacement gauge, it is advantageous to provide the laser displacement gauge in the rearmost circular cylindrical body 54 or in the housing 6 to which the rearmost circular cylindrical body 54 is fixed.

In the present embodiment, the center of gravity position of the arm part 5 is estimated based on the relative positional relationship between all the circular cylindrical bodies 51, 52, 53, 54 constituting the arm part 5. However, from the viewpoint of only estimating the center of gravity position of the arm part 5, the center of gravity position of the arm part 5 may be estimated based on, for example, the relative positional relationship between three circular cylindrical bodies, that is, the foremost circular cylindrical body 51, the rearmost circular cylindrical body 54, and one of the other circular cylindrical bodies 52, 53, although the accuracy of the estimation is lower than that of the estimation processing described above. In this case, the laser displacement gauge 100 is mounted on the foremost circular cylindrical body 51 or the rearmost circular cylindrical body 54, and is configured to measure only the distance to one of the circular cylindrical bodies 52, 53. Of the circular cylindrical bodies 52, 53, a circular cylindrical body that has a large influence on the fluctuation in the center of gravity position, such a heavy circular cylindrical body or a circular cylindrical body with a large variation in the distance to the rearmost circular cylindrical body 54, is desirably selected as the circular cylindrical body whose position is to be identified.

For example, the linear motion mechanism 4 is configured as follows.

Figure 6:
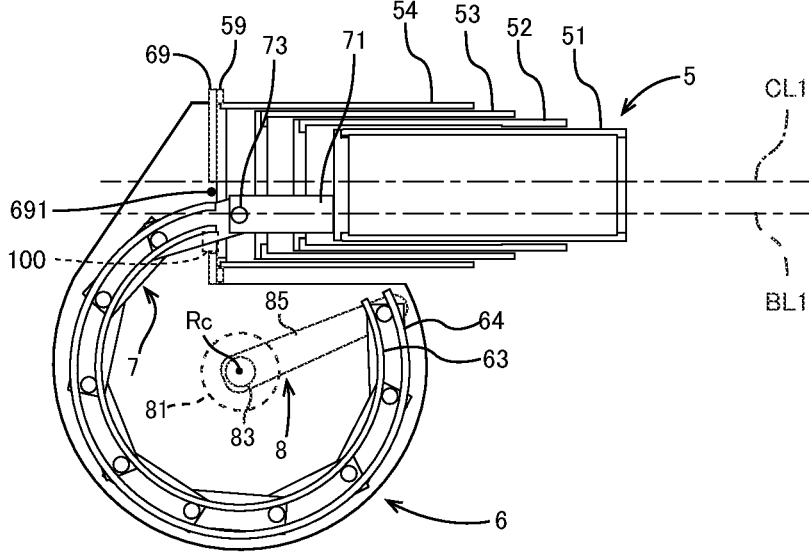
FIG. 6 is a side view showing an internal structure of the linear motion mechanism when the arm part shown in FIG. 2 is contracted.
Figure 7:
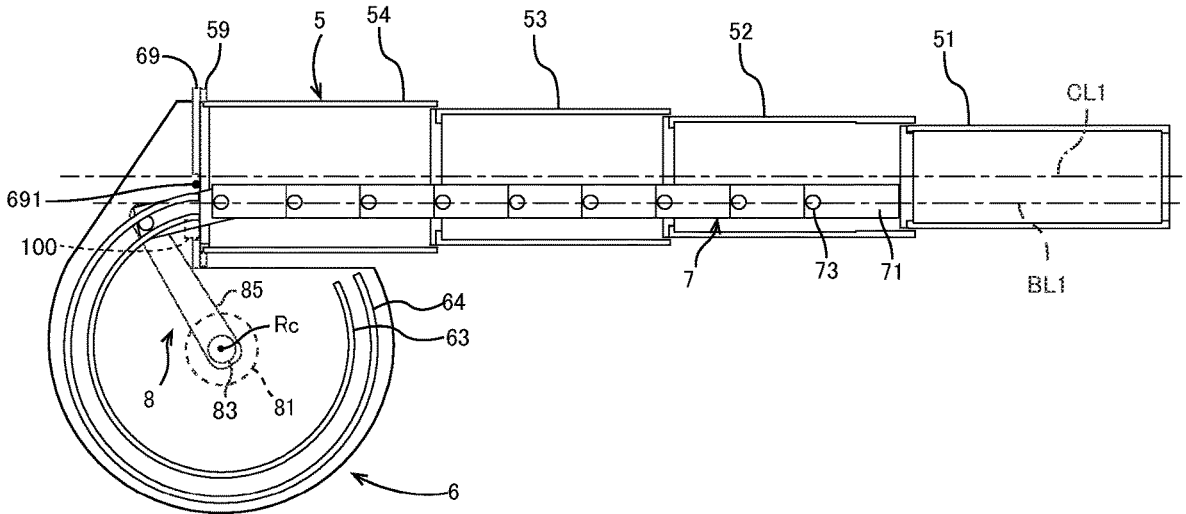
FIG. 7 is a side view showing an internal structure of the linear motion mechanism when the arm part shown in FIG. 3 is extended.

The arm part 5 is supported by the housing 6. As shown in FIG. 4, typically, the housing 6 is configured in a substantially short circular cylindrical shape with approximately a ¼ circle cut out at the top. A mount plate 69 is attached to the cut-out portion at the top of the housing 6. A flange 59 formed at the rear end of the arm part 5, that is, the rear edge of the rearmost circular cylindrical body 54 is joined to the mount plate 69, and is fastened by bolts or the like. An opening 691 is formed in the mount plate 69. The inside of the housing 6 thereby communicates with the hollow interior of the circular cylindrical bodies 51, 52, 53, 54 (the hollow interior of the arm part 5). As shown in FIG. 6 and FIG. 7, the block row 7 is inserted into a space communicating from the inside of the housing 6 to the hollow interior of the circular cylindrical bodies 51, 52, 53, 54. The opening 691 serves as an entrance for the block row 7 to enter and exit the housing 6.

The block row 7 is formed by coupling a plurality of blocks 71 in a row. Each block 71 has a rectangular parallelepiped shape, and cam followers 73 are attached to both side surfaces of the block 71. The block 71 has such a shape and a coupling structure that, in a state where two adjacent blocks 71 are linearly arranged, further upward rotation is restricted, but downward rotation is allowed.

The foremost block 71 of the block row 7 is connected to the foremost circular cylindrical body 51 of the plurality of circular cylindrical bodies 51, 52, 53, 54. In a state where the arm part 5 is contacted, the block row 7 is mostly accommodated inside the housing 6. Typically, the block row 7 is accommodated in the housing 6 in an arc shape centered on a housing center Rc. Therefore, a pair of guide rails 63, 64 serving as an accommodation part for accommodating the block row 7 along the arc trajectory are provided on the inner surface of each of both side plates of the housing 6. Typically, the pair of guide rails 63, 64 are configured as wire bodies curved in an arc shape, with the arc center coinciding with the housing center Rc, and the distance between the guide surface of the outer guide rail 64 and the guide surface of the inner guide rail 63 being equivalent to or slightly larger than the diameter of the cam followers 73 attached to the block 71.

A block row drive mechanism 8 that achieves the feeding operation and pulling back operation of the block row 7 is provided inside the housing 6. In the present embodiment, the block row drive mechanism 8 includes a motor (not shown) and a reduction gear 81 for reducing the rotational speed of the motor. The reduction gear 81 is arranged so that the rotational center of its rotary shaft 83 coincides with the housing center Rc. One end (proximal end) of a rod-shaped rotary arm 85 is connected to the rotary shaft 83 of the reduction gear 81. The other end (distal end) of the rotary arm 85 is connected to the rearmost block 71.

When the motor rotates in the forward direction, the block row 7 is pushed out by the rotary arm 85, and the foremost block 71 is moved forward along the movement axis BL1 parallel to the cylinder center line CL1. As the foremost block 71 moves forward, the circular cylindrical bodies are pulled out from the rear circular cylindrical bodies sequentially from the foremost circular cylindrical body 51, and as a result, the arm part 5 is extended forward along the cylinder center line CL1.

When the motor rotates in the backward direction, the block row 7 is pulled back by the rotary arm 85, and the foremost block 71 is moved backward along the movement axis BL1 parallel to the cylinder center line CL1. As the foremost block 71 moves backward, the circular cylindrical bodies are accommodated in the rear circular cylindrical bodies sequentially from the foremost circular cylindrical body 51, and as a result, the arm part 5 is contracted backward along the cylinder center line CL1.

As described above, the block row 7 and the block row drive mechanism 8 for driving the movement of the block row 7 constitute the arm drive mechanism for driving the forward and backward movement of the foremost circular cylindrical body 51, that is, the extension and contraction of the arm part 5.

In the present embodiment, the block row 7 is pushed out and pulled back by the rotary arm 85 to drive the movement of the foremost circular cylindrical body 51, but the configuration of the arm drive mechanism is not limited to the one in the present embodiment as long as it can drive the movement of the foremost circular cylindrical body 51. For example, a rack-and-pinion mechanism may be applied so that a gear formed on the block 71 and a drive gear provided on the movement trajectory of the block row 7 are meshed with each other to feed the block row 7 out of the housing 6 and to pull the block row 7 back to the housing 6. Alternatively, the movement of the foremost circular cylindrical body 51 may be driven by an existing linear motion mechanism, such as a ball screw mechanism, without using the block row 7.

Figure 8:
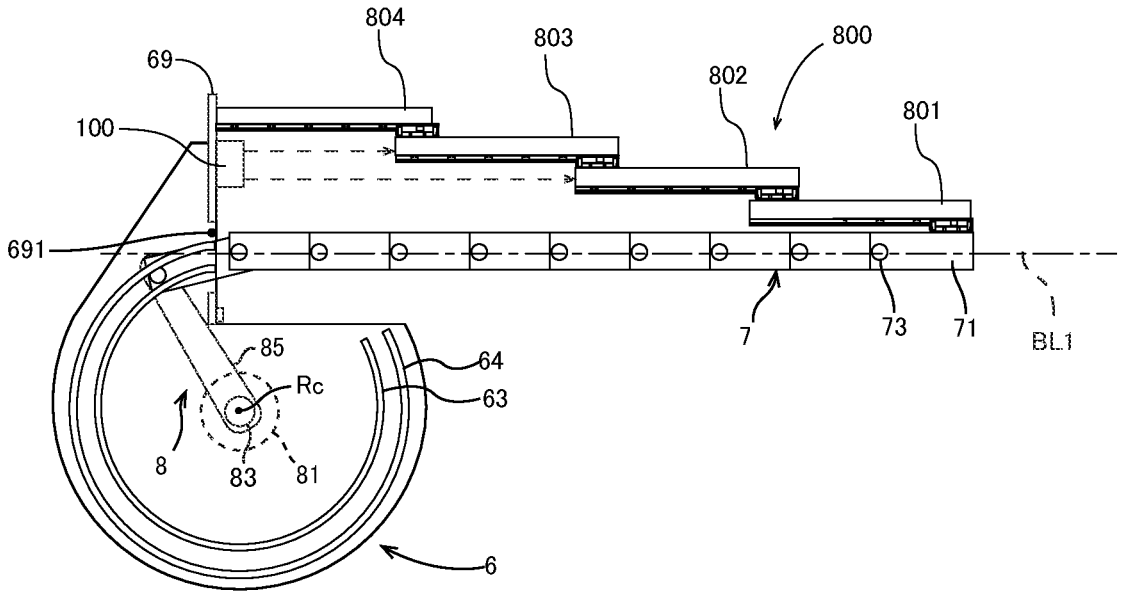
FIG. 8 is a side view showing another example of the arm part shown in FIG. 1.

The arm part 5 according to the present embodiment is not limited to the one having a telescopic structure. For example, as shown in FIG. 8, an arm part 800 may be composed of a plurality of cascaded linear motion guide mechanisms 801, 802, 803, 804. Each of the linear motion guide mechanisms 801, 802, 803, 804 is composed of a linear guide supported by a base and a movable body slidable on the linear guide. The base supporting the linear guide of the rearmost linear motion guide mechanism 804 among the plurality of linear motion guide mechanisms 801, 802, 803, 804 is fixed to the mount plate 69 of the housing, and the foremost block 71 of the block row 7 is connected to the movable body (slider) of the foremost linear motion guide mechanism 801. The arm part 800 is extended and contracted as the block row 7 moves forward and backward along the movement axis BL1 with respect to the rearmost linear motion guide mechanism 801. The linear extension/contraction mechanism employing the arm part 800 composed of the plurality of linear motion guide mechanisms 801, 802, 803, 804, which differs only in configuration from the arm part 5, has the same effect as the arm part 5 employing the telescopic structure.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot apparatus comprising: an arm part comprising a telescopic structure in which four circular cylindrical bodies are assembled in multi-stages; a movement drive mechanism comprising a block row, the block row being accommodated in the telescopic structure and connected to a foremost one of the four circular cylindrical bodies, such that the telescopic structure is extended and contracted by the block row; a position identification unit for identifying a first distance from a rearmost one to the foremost one of the four circular cylindrical bodies, and a second distance from the rearmost one to two middle ones adjacent to each other between the rearmost one and the foremost on the four cylindrical bodies; a center of gravity position estimation processing unit that estimates a center of gravity position of the arm part, based on the first distance and the second distance; the four circular cylindrical bodies extends and contracts linearly; the foremost one of the four circular cylindrical bodies is moved by the movement drive mechanism and the two middle ones of the four circular cylindrical bodies moves freely with respect to each other and freely from the foremost one and the rear most one, along extending and contracting directions, upon movement of the foremost one.

2. The robot apparatus according to claim 1, wherein the position identification unit includes a sensor for detecting a distance of each of the four circular cylindrical bodies other than the foremost one with respect to the rearmost one.

3. The robot apparatus according to claim 2, wherein the sensor is attached to the rearmost one of the four circular cylindrical bodies or a support member supporting the rearmost one.

4. The robot apparatus according to claim 1, wherein the arm part is composed of a plurality of linear guides and a plurality of movable bodies configured to move along the linear guides.

* * * * *